(12) United States Patent
Cheng

(10) Patent No.: US 6,663,125 B1
(45) Date of Patent: Dec. 16, 2003

(54) VEHICLE BOLT-ON ADJUSTABLE SIDE STEP

(76) Inventor: John C. Cheng, 768 S. Turnbull Canyon Rd., City of Industry, CA (US) 91745

( * ) Notice: Subject to any disclaimer, the term of this patent is extended or adjusted under 35 U.S.C. 154(b) by 120 days.

(21) Appl. No.: 10/075,665

(22) Filed: Feb. 15, 2002

(51) Int. Cl.[7] .................................................. B60R 3/02
(52) U.S. Cl. ........................................ 280/166; 280/760
(58) Field of Search ............................. 280/163, 164.1, 280/164.2, 166, 169, 760

(56) References Cited

U.S. PATENT DOCUMENTS

| | | | | |
|---|---|---|---|---|
| 3,887,217 A | * | 6/1975 | Thomas | 280/166 |
| 3,955,827 A | * | 5/1976 | Wonigar | 280/166 |
| 4,017,093 A | * | 4/1977 | Stecker, Sr. | 280/163 |
| 4,174,115 A | * | 11/1979 | Youngblood | 280/163 |
| 4,412,686 A | * | 11/1983 | Fagrell | 280/166 |
| 4,453,684 A | * | 6/1984 | Hanks | 244/129.5 |
| 5,193,829 A | * | 3/1993 | Holloway et al. | 280/163 |
| 5,713,589 A | * | 2/1998 | Delgado et al. | 280/163 |
| 5,806,869 A | * | 9/1998 | Richards | 280/163 |
| 6,082,751 A | * | 7/2000 | Hanes et al. | 280/163 |
| 6,375,207 B1 | * | 4/2002 | Dean et al. | 280/166 |

* cited by examiner

*Primary Examiner*—Paul N. Dickson
*Assistant Examiner*—Toan To
(74) *Attorney, Agent, or Firm*—Albert O. Cota

(57) ABSTRACT

A bolt-on, adjustable vehicle side step for a sports utility vehicle, pick-up truck or four wheel drive vehicle utilizing a pair of rocker panel attaching brackets (20) with an outward-extending integral male cog gear (22) that fastens onto a vehicle rocker panel. A pair of arms (34) having a female cog gear bore (36) and a step receiving hole (38) are juxtaposed on the bracket, with each male cog gear penetrating a bracket bore at an angle accommodating the configuration of a given vehicle and a desired step location. A pair of length adjustable legs (42) are nested together and attached to the brackets. Each pair of legs adjustably expand between the vehicle's frame and the brackets, thus forming an unyielding, compressible rigid structure. A step platform (64) is disposed within each connecting arm step receiving hole on each end such that the platform spaces the arms apart and provides a convenient footstep to assist a person who is entering or exiting the vehicle.

18 Claims, 5 Drawing Sheets

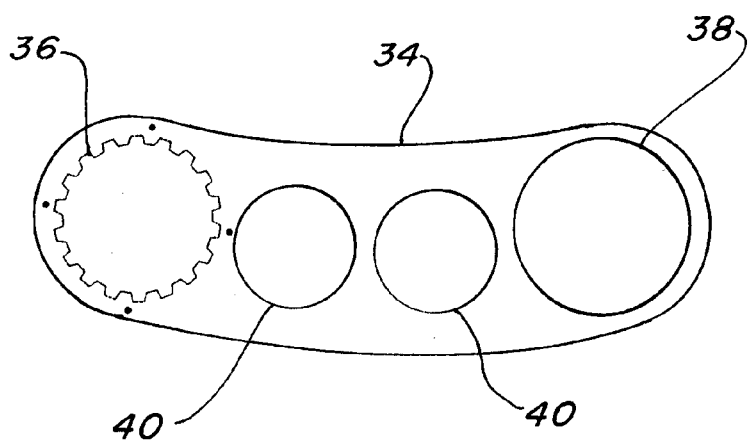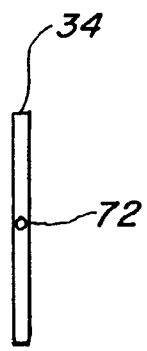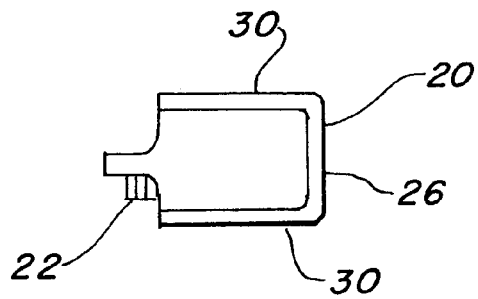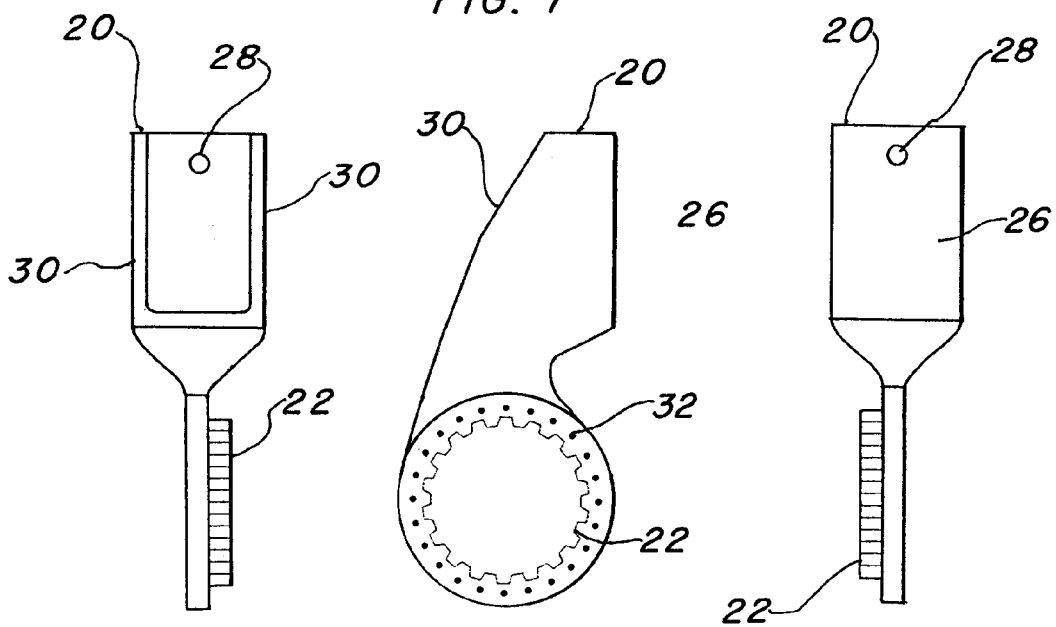

VEHICLE BOLT-ON ADJUSTABLE SIDE STEP

TECHNICAL FIELD

The present invention pertains to vehicle side steps in general, and more specifically to a side step that is bolted onto a vehicle frame and has an angular adjustment relative to the radial extension and height of the side step.

BACKGROUND ART

Previously, many types of vehicle aftermarket steps, have been in use to provide an effective means to enter and exit a vehicle that has a body which is elevated from the ground.

The prior art found did not disclose any patents that possess the novelty of the instant invention, however the following U.S. patents are considered related:

| Patent Number | Inventor | Issue Date |
|---|---|---|
| 4,017,093 | Stecker, Sr. | Apr. 12, 1977 |
| 5,193,829 | Holloway et al. | Mar. 16, 1993 |
| 5,713,589 | Delgado et al. | Feb. 3, 1998 |
| 5,806,869 | Richards | Sep. 15, 1998 |
| 6,082,751 | Hanes et al. | Jul. 4, 2000 |

Stecker, Sr. in U.S. Pat. No. 4,017,093 teaches a step equal to the width on a persons foot that is positioned on a pair of support arms that extend from the top surface of the step. The support arms have upstanding portions which are engaged by a bracket assembly that connects them to a vehicle frame.

U.S. Pat. No. 5,193,829 issued to Holloway et al. is for a sub-frame support system and running board for a vehicle. The running board is removably mounted on a sub frame with a pair of sockets for receiving a frame member. The running board is a structural member having shaped support members extending from its ends which are configured to mount in the sockets. Pins retain the support members in the sockets, allowing the running board to be removed.

Delgado et al in U.S. Pat. No. 5,713,589 discloses a side step which mounts to tubular side bars. The step includes a mounting insert for placement within the side bars with a structure to mount the step. The step is provided with a grid of ribs and channels to reduce the amount of material required while providing adequate strength.

Richards in U.S. Pat. No. 5,806,869 teaches a conversion kit for a protected step. The kit includes a hanger framework capable of mounting beneath several different vehicle chassis. A step is supported on the hanger framework which includes a step deck spaced below the bottom edge of a vehicle door. The edge of the door is covered with a skirt.

U.S. Pat. No. 6,082,751 issued to Hanes et al. discloses a retractable and extendible step mounted on a vehicle to facilitate passenger ingress and egress. The step includes a frame that is mounted onto the vehicle beneath a doorway, and a movable linkage arrangement supporting the step tread from the frame to control movement between a retracted and extended position.

DISCLOSURE OF THE INVENTION

Full size pick-up trucks and sports utility vehicles including both two-wheel and four-wheel drive, have become extremely popular in the United States and in foreign countries. Further, large tire size combined with the large size of the vehicle has created a problem of entering and exiting a vehicle, as the bottom of the vehicle's frame and body is relatively high with respect to the ground. The original equipment manufacturer has addressed the problem only on a limited basis by offering running boards on some sports utility vehicles and vans however the difficulty still remains in the majority of cases. As mentioned above, side steps and running boards have been developed as aftermarket equipment however, the fact that there is such a wide variety of vehicle configurations and only a few designs that have been successful and are on the market today indicates that there is need for improvement in the field of side steps.

Therefore the primary object of the invention is to utilize an adjustable side step that is able to fit a large number of vehicles, as the step is attached only to a vehicle's rocker panel. Additionally, a telescoping arm can be adjusted to fit tightly against the vehicle's frame, thus stabilizing the assembly sufficiently to achieve the desired strength and rigidity. This advantage is realized by the number of manufacturer models and year types that the side step will fit, as the adjustment is substantially universal since the distance between most vehicle's rocker panel and frame is within the extensible parameters of the invention.

An important object of the invention is again directed to the adjustment capabilities of the side step, as the angle of the step from underneath the rocker panel relative to the ground is adjustable prior to installation, which gives the option of how low the foot tread is and how far it extends from the vehicle. The angle of the foot tread is also adjustable to assure that the top surface is in the desired horizontal plane.

Another object of the invention is often the most important aspect to some individuals, as the overall appearance of their vehicle is affected by the addition of the side step. The invention fulfills this need completely as the elements that are visible are polished cast aluminum and stainless steel, with an aesthetic modern design that is pleasing to the eye and very robust in its presentation. The angular adjustment is accomplished with a cog gear extending from an attaching bracket with an arm having a female mating hole which is flush with the bracket, thereby leaving only the outline of the gear visible. The gear is substantially three inches in diameter, thus creating the perceptible effect of strength with the arms some quarter inch thick again allowing the side step to appear strong, solid and efficient while still being aesthetically pleasurable.

Still another object of the invention is the ease of installation, as it is necessary to drill only two holes in the inner, unexposed sheet metal rocker panel and attach a cast aluminum bracket onto each hole with a conventional nut and bolt. The stiffness is achieved by extending a pair of nested, compression leg angle members with two carriage bolts in slots to engage the vehicle frame on one end and the bracket on the other. The final compression is made by tensioning a flat-head bolt with a resilient cap against the frame and securing it in place with a locking nut. It can be clearly seen that no modification of the vehicle frame is necessary, therefore the structural integrity of the frame is not compromised in any way which is required by some prior art.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 5 is a side elevation view of the step connecting arm completely removed from the invention for clarity.

FIG. 6 is a end view of the step connecting arm completely removed from the invention for clarity.

FIG. 7 is a top view of the rocker panel attaching bracket completely removed from the invention for clarity.

FIG. 8 is a left side view of the rocker panel attaching bracket completely removed from the invention for clarity.

FIG. 9 is a front view of the rocker panel attaching bracket completely removed from the invention for clarity.

FIG. 10 is a right side view of the rocker panel attaching bracket completely removed from the invention for clarity.

BEST MODE FOR CARRYING OUT THE INVENTION

The best mode for carrying out the invention is presented in terms of a preferred embodiment for a vehicle bolt-on adjustable side step. The preferred embodiment, as shown in FIGS. 1 through 19, is comprised of a pair of rocker panel attaching brackets 20 each including an outward-extending integral male cog gear 22, as illustrated in FIGS. 7 through 10.

Figure 4:
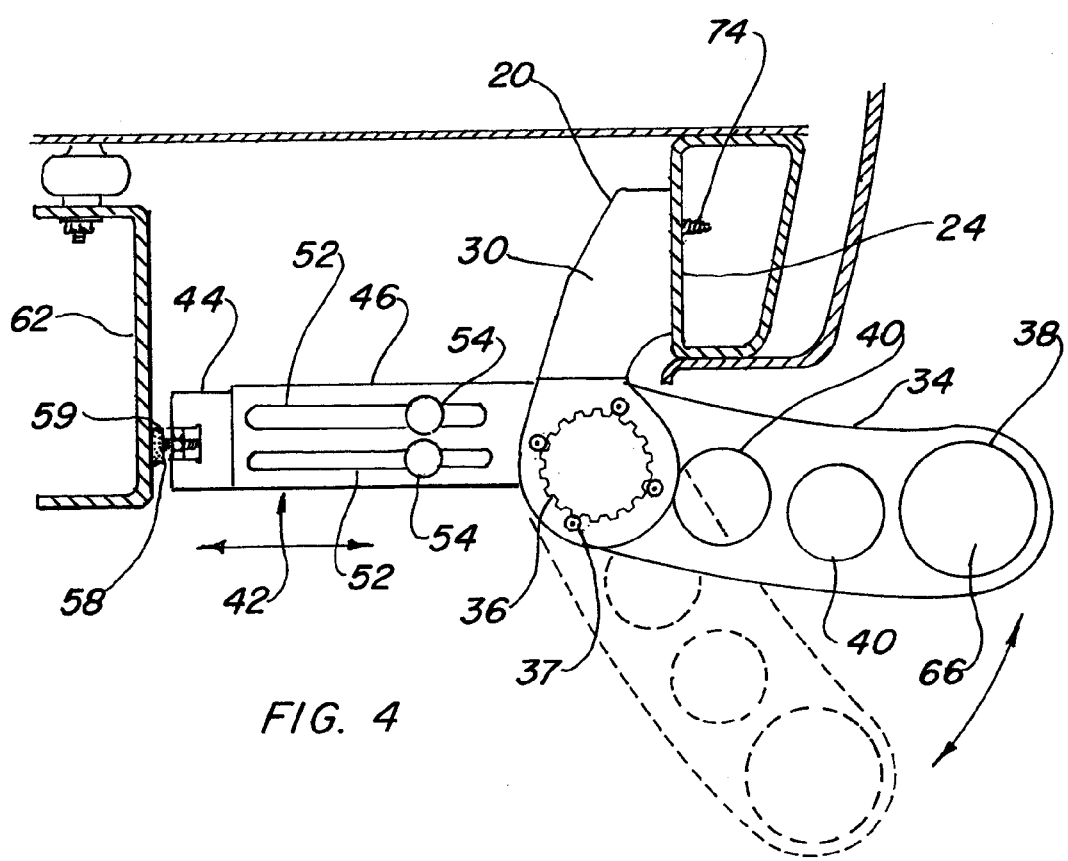
FIG. 4 is a cross sectional view taken along lines 4—4 of FIG. 1 showing the vehicle partially in cross section with the components required for mounting.

Each bracket 20 is configured to fasten onto a vehicle rocker panel 24, preferably using a flat surface 26 that is shaped to interface with an inner flange of a vehicle's rocker panel 24, as depicted in FIG. 4. Normally a single mounting hole 28 is all that is necessary to permit a threaded fastener to be installed between the bracket and the vehicle rocker panel. A single fastener is usually sufficient for securement therebetween, as the load on the fastener is in shear however, a plurality of fasteners of various types may be employed according to the type of vehicle and its requirements.

The brackets 20 include a pair of integrally parallel gussets 30 adjacent to each edge of the flat surface 26, which provides the requisite rigidity. A plurality of threaded holes 32 are located on a bolt circle that encircles the cog gear 22, as shown best in FIG. 9, and are used for adjustably attaching the brackets. The preferred material and type of construction of the bracket 20 is cast aluminum, however other materials and processes may be used such as cast iron, stamped steel or reinforced thermoplastic and the like.

A pair of step connecting arms 34, each having female cog gear bore 36 and a step receiving hole 38, are juxtaposed on each bracket 20. The male cog gear 22 penetrates into the bracket bore 36 at an angle between the bracket 20 and the arm 34, dependent upon the cog's spacing, which permits radial adjustment of the angle of the arm 34 to the bracket 20, thus accommodating a given vehicle and allowing adjustment to the desired step angle. The arms 34 are secured to each respective bracket 20 with a plurality of flat-head capscrews 37 through countersunk holes in the arms 34, as shown in FIGS. 2, 4, 5 and 19, which align with the threaded holes 32 in the brackets.

For enhancing the overall appearance of the side step and to reduce weight, the step connecting arms 34 preferably have a plurality of lightning holes 40 positioned between the female cog gear b ore 36 and the step receiving hole 38. Further, as illustrated in the drawings, particularly in FIGS. 5 and 6, the step connecting arms 34 are flat and have a radially-curved configuration with radiused ends. The arms 34 also have a corresponding thickness relative to the outward-extending male cog gear 22, thereby creating a flush appearance when the brackets 20 and the arms 34 are mated together.

The type of material and method of construction may vary according to economic requirements, such as stamped aluminum or steel, or reinforced thermoplastic however, cast polished aluminum is the preferred fabrication material.

Figure 1:
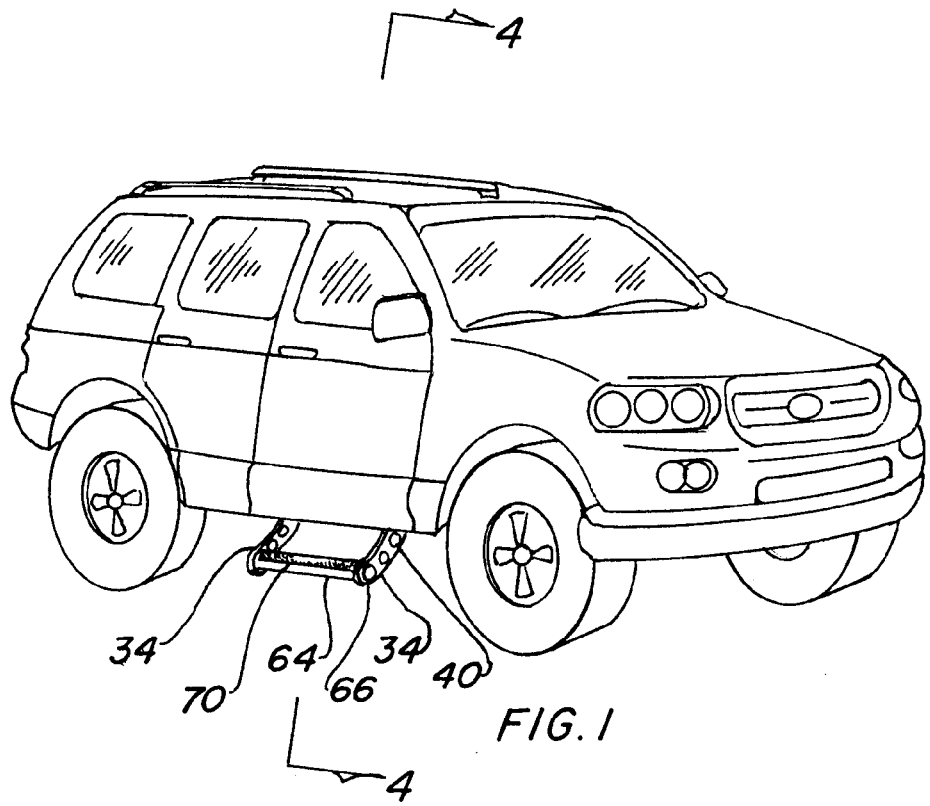
FIG. 1 is a partial isometric view of the preferred embodiment mounted onto a four wheel drive sports utility vehicle.
Figure 2:
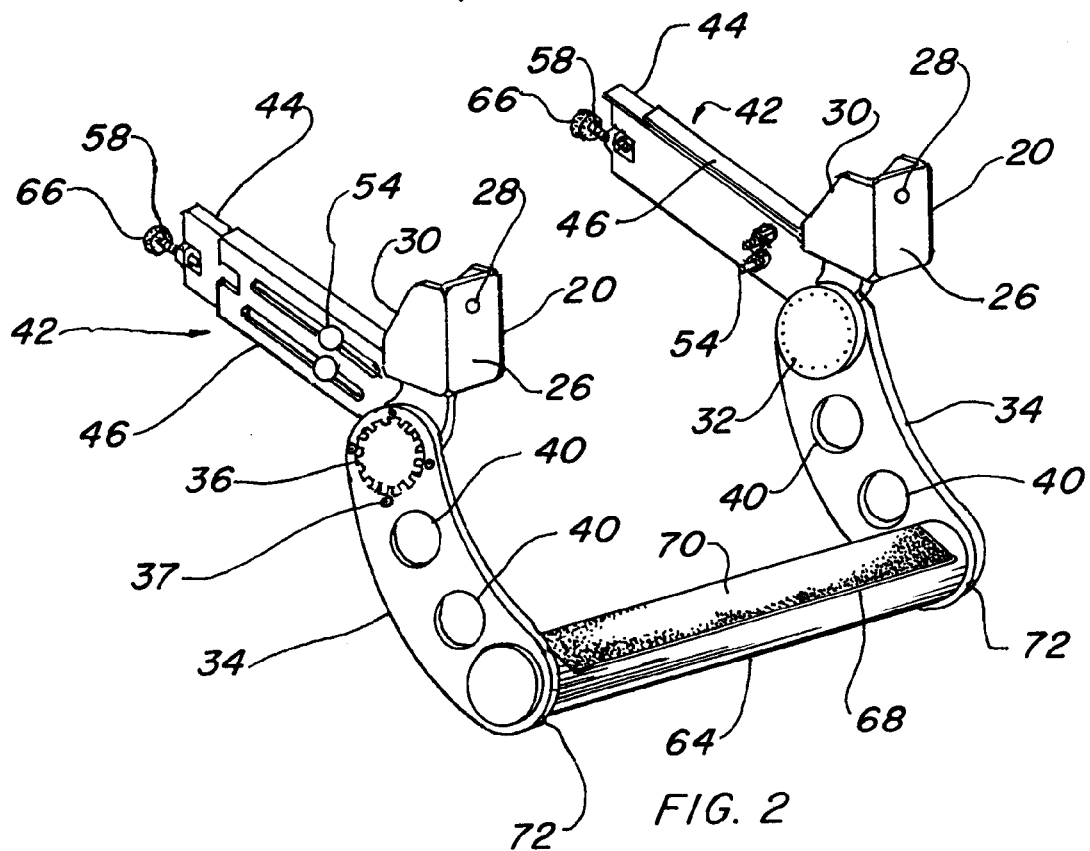
FIG. 2 is a partial isometric view of a fully assembled preferred embodiment illustrated by itself without a vehicle upon which it is normally mounted.
Figure 3:
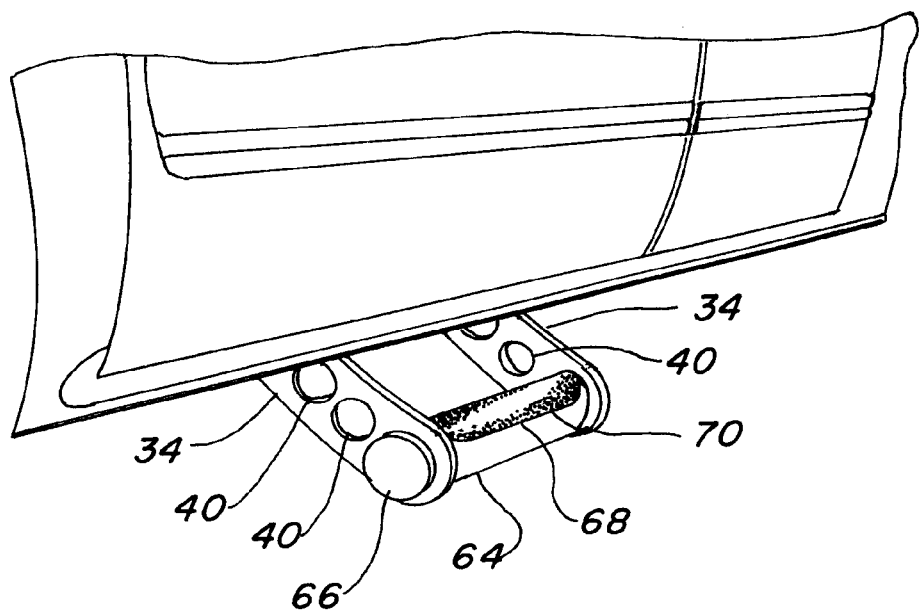
FIG. 3 is a partial isometric view of the preferred embodiment mounted on one side of a pick-up truck.
Figure 11:
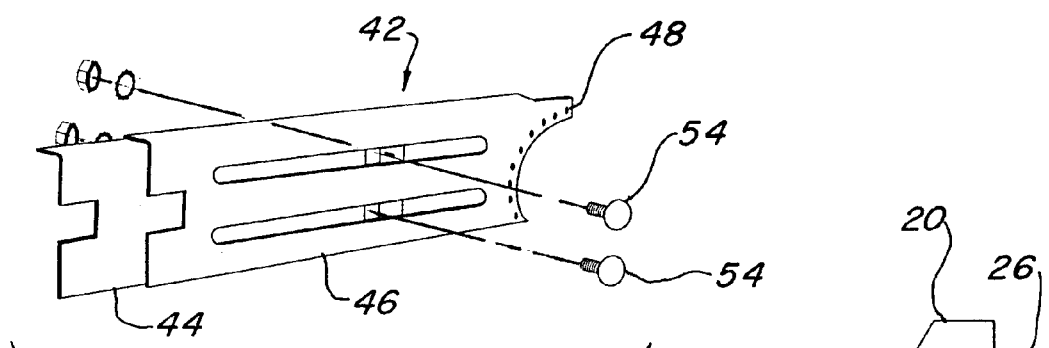
FIG. 11 is an exploded partial isometric view of the length adjustable frame compression legs nested together and completely removed from the invention for clarity.
Figure 12:
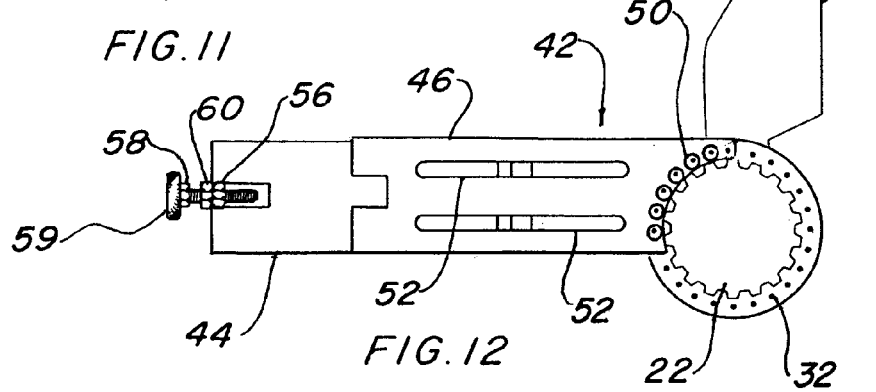
FIG. 12 is a front view of the compression legs attached to the bracket, again completely removed from the invention for clarity.
Figures 13, 14, 15:
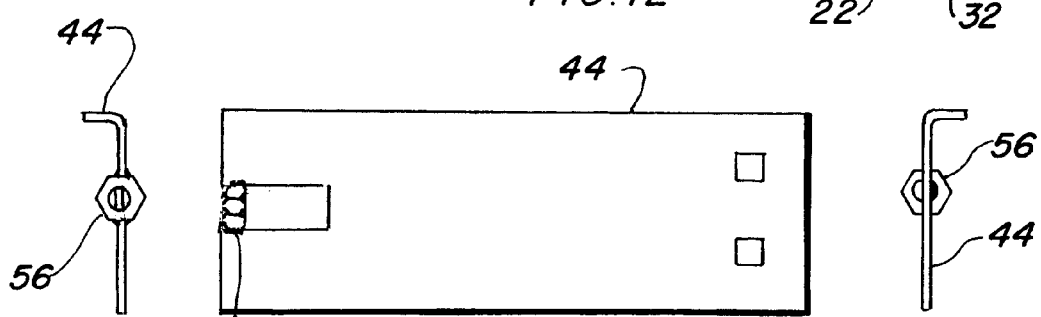
FIG. 13 is a left side view of a inside angle of the compression legs completely removed from the invention for clarity.
FIG. 14 is a front view of a inside angle of the compression legs completely removed from the invention for clarity.
FIG. 15 is a right side view of the inside angle of the compression legs completely removed from the invention for clarity.
Figures 16, 17, 18:
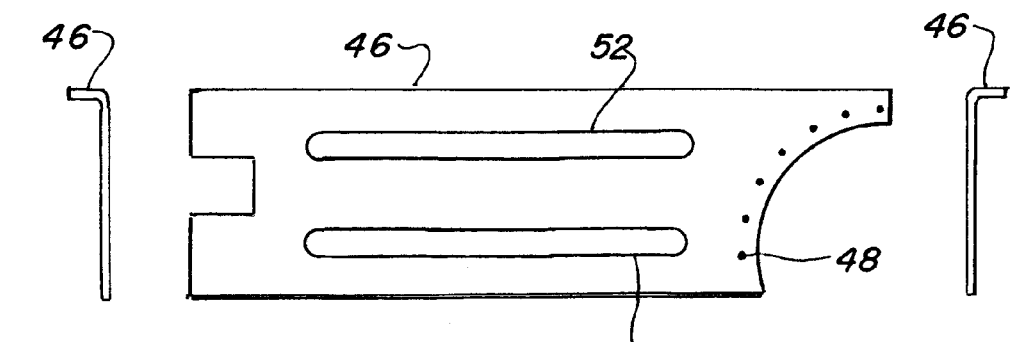
FIG. 16 is a left side view of the outside angle of the compression legs completely removed from the invention for clarity.
FIG. 17 is a front view of the outside angle of the compression legs completely removed from the invention for clarity.
FIG. 18 is a right side view of the outside angle of the compression legs completely removed from the invention for clarity.
Figure 19:
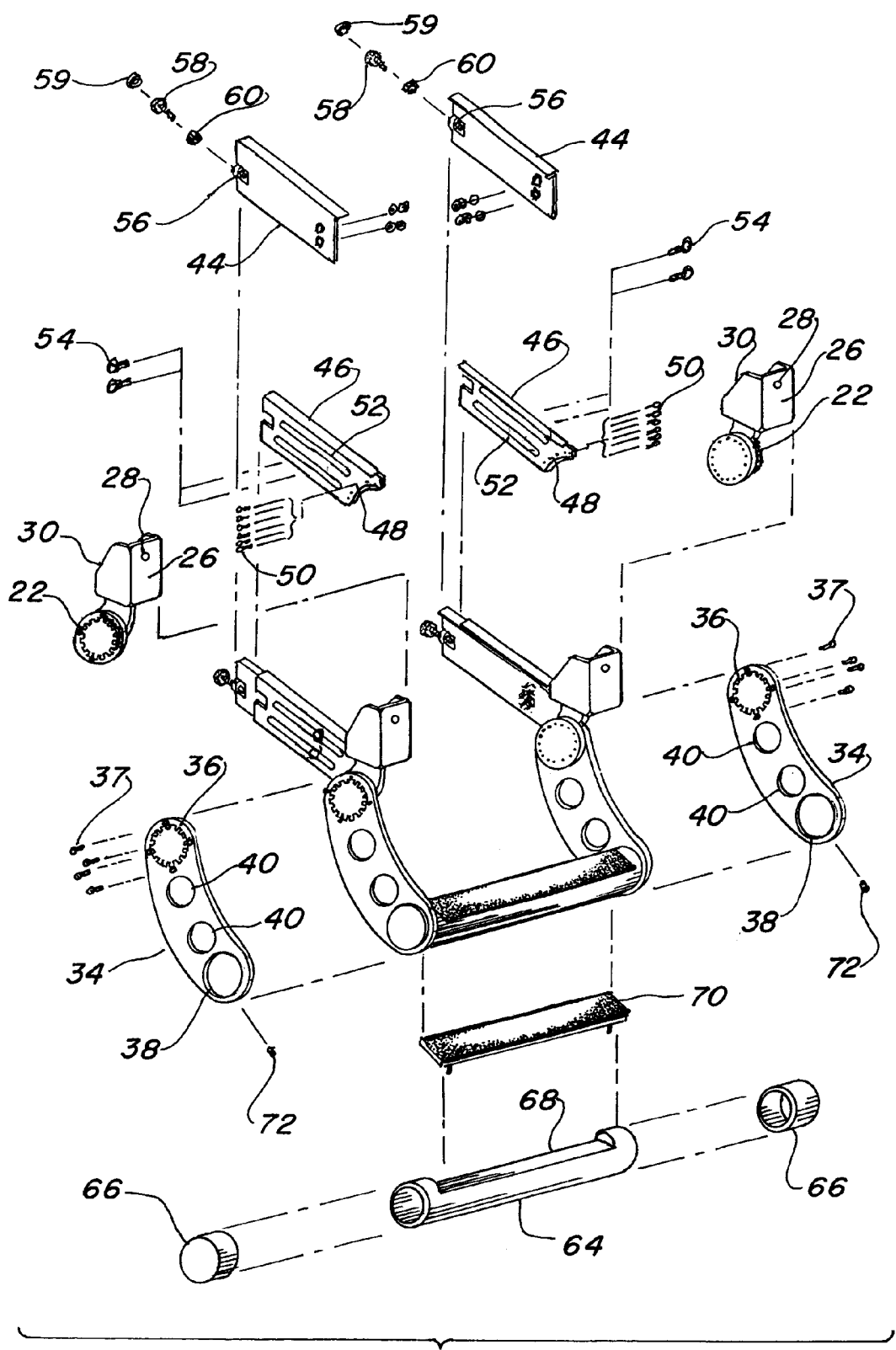
FIG. 19 an exploded view of the preferred embodiment.

A pair of length adjustable frame compression legs 42 are nested together, as shown in FIG. 11, and consist of an inner angle member 44 and an outer angle member 46 that act in concert with a slideingly contiguous relationship. The outer angle member 46 further includes a plurality of countersunk holes 48 on the same bolt circle that encircles the cog gear 22, which permits each leg outer angle member 46 to be attached to the bracket 20 at a desired angular displacement with countersunk screws 50, as illustrated in FIG. 12. Once the outer angle member 46 is attached to the bracket 20 it is sandwiched between the bracket and the arm 34, as shown in FIGS. 2 and 19.

The frame compression leg inner member 44 and outer member 46 each have mating slots 52 therein; a plurality of carriage bolts 54 connect the slots 52 together in an adjustable manner, as shown in FIGS. 4 and 11. The inner angle 44 has a nut 56 welded on an end opposite the end adjacent to the bracket 20, a bolt 58 with a resilient cap 59 and a locking nut 60 is threadably engaged to the welded nut 56 for final adjustment and to apply compressive force between the bracket and a vehicle frame 62. The legs 42, which comprise the inner and outer angle members 44 and 46, are preferably formed of sixteen gauge 0.0725 inch (1.84 millimeters) galvanized steel however, other material may also be used with equal ease and dispatch.

When each pair of legs 42 are adjustably expanded between the rocker panel attaching bracket 20 on a first end, and the vehicle frame 62 on a second end, as depicted in FIG. 4, the combination forms an unyielding, compressible rigid structure which is easy to install and replace if damaged.

A step platform 64 is fixably disposed within each connecting arm step receiving hole 38, such that the platform 64 spaces the arms 34 apart and provides a convenient footstep to assist a person when entering or exiting into a vehicle. The step platform 64 preferably comprise a round, seventeen gauge stainless steel tube with a wall thickness of 0.065 inches (1.65 millimeters). Additionally, the platform 64 has a stainless steel end cap 66 in each open extremity, as shown best in FIG. 19. The end cap 66 acts as a spacer on each end of the platform 64 and protects the inside of the invention from the accumulation of foreign matter and debris. The length of the step platform 64 may vary to conform to the application, as an example, from the length of ones foot to wide enough to cover two adjacent doors.

The step platform 64, in the form of a round stainless steel tube, further includes a recess 68 on its upper surface, with a high-impact plastic, slip-resistant tread 70 disposed within the recess 68, which forms a non-slip surface on the step platform 64. The step platform 64 is attached to the arm 34 with at least one set screw 72, as shown in FIGS. 2, 6 and 19, which not only secures it in place but also provides rotational adjustment to keep the tread 70 horizontal at any regulated position.

The installation procedure of the vehicle side step is simple, as the entire assembly may be pre-assembled, with the step platform 64 aligned with the center of a vehicle seat. Holes may then be drilled in the rocker panel 24 and the assembly mounted in place with sheet metal screws 74 through the mounting holes 28 in the bracket 20. The legs 42 may then be adjusted, as illustrated in FIG. 4, the carriage bolts 54 tightened, and the final compression made with the bolt 54 and secured with the locking nut 60.

Not all vehicles have the same spacing between the rocker panel 24 and the frame 62 however, the invention is configured to fit a large variety of models and slight changes may be made in the dimensions to fit other makes and varieties without major redesign. Further, some vehicle models have wiring harnesses and even air conditioning piping running through the rocker panel 24 however, it has been found that with care the obstructions may be slightly relocated to obviate the interference.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

What is claimed is:

1. A vehicle bolt-on adjustable side step comprising;

a) a pair of rocker panel attaching brackets each having an outward-extending integral male cog gear, wherein each bracket is configured to fasten onto a vehicle rocker panel, b) a pair of step connecting arms each having female cog gear bore and a step receiving hole, with each arm juxtaposed upon said bracket, and each male cog gear penetrating into the female cog gear bore at an angle between the bracket and the arm, dependent upon the cog's spacing, for accommodating a given vehicle and a desired step angle, c) a pair of length-adjustable frame, compression legs nested together, each pair having an inner angle member and an outer angle member in concert having a slideingly contiguous relationship, with the outer angle member sandwiched between the bracket and the arm, with said pair of legs adjustably expanding between the rocker panel attaching bracket on a first end and a vehicle frame on a second end, thus forming an unyielding, compressible rigid structure, and d) a step platform fixably disposed within each connecting arm step receiving hole on each end such that the platform spaces the arms apart and provides a convenient footstep to assist a person who is entering and exiting a vehicle.

2. The vehicle side step as recited in claim 1 wherein said rocker panel attaching brackets are manufactured from cast aluminum.

3. The vehicle side step as recited in claim 1 wherein said rocker panel attaching brackets further having a flat surface configured to interface with a vehicle rocker panel.

4. The vehicle side step as recited in claim 3 flat wherein said bracket flat surface having a single mounting hole permitting a threaded fastener to be installed between the bracket and a vehicle rocker panel for securement therebetween.

5. The vehicle side step as recited in claim 3 wherein said rocker panel attaching brackets further comprise a pair of integral parallel gussets adjacent to each edge of the flat surface for rigidity.

6. The vehicle side step as recited in claim 1 wherein said rocker panel attaching brackets each having a plurality of threaded holes on a bolt circle encircling the cog gear.

7. The vehicle side step as recited in claim 1 wherein said step connecting arms are made from polished cast aluminum.

8. The vehicle side step as recited in claim 1 wherein said step connecting arms further having a plurality of lightning holes positioned between the female cog gear bore and the step receiving hole for reducing weight and for enhancing the overall appearance of the side step.

9. The vehicle side step as recited in claim 1 wherein said step connecting arms are flat and have a radially curved configuration with radiused ends.

10. The vehicle side step as recited in claim 1 wherein said step connecting arms are of a corresponding thickness relative to the outward-extending male cog gear, thereby creating a flush appearance.

11. The vehicle side step as recited in claim 1 wherein said frame compression legs are formed of sixteen gauge 0.0725 inch (1.84 millimeters) galvanized steel.

12. The vehicle side step as recited in claim 1 wherein said frame compression leg inner member and outer member each having slots therein and a plurality of carriage bolts to connect the slots together in an adjustable manner.

13. The vehicle side step as recited in claim 1 wherein each frame compression leg inner angle further comprises a nut welded on an end opposite the end adjacent to the bracket, and arm with a bolt having a locking nut threadably engaging the nut for final adjustment and to apply compressive force between the bracket and a vehicle frame.

14. The vehicle side step as recited in claim 1 wherein each frame compression leg outer angle member further having a plurality of countersunk holes on a bolt circle encircling the cog gear, thus permitting each leg outer angle member to be attached to the bracket at a desired angular displacement.

15. The vehicle side step as recited in claim 1 wherein said step platform further comprises a round, seventeen gauge, stainless steel tube with a wall thickness of 0.065 inches (1.65 millimeters).

16. The vehicle side step as recited in claim 15 wherein said step platform round, stainless steel tube having a stainless steel end cap in each open extremity.

17. The vehicle side step as recited in claim 15 wherein said step platform round, stainless steel tube having a recess on a top surface with a high-impact plastic, slip-resistant tread disposed within the recess which forms a non-slip surface on the step.

18. A vehicle bolt-on adjustable side step comprising:
a) a pair of rocker panel attaching brackets each having an outward-extending integral male cog gear, wherein said bracket configured to fastening onto a vehicle rocker panel,
b) a pair of step connecting arms each having female cog gear bore interfacing with the male cog gear,
c) a pair of length-adjustable, frame compression legs attached to the bracket, thereby forming a compressible junction between the bracket and a vehicle frame, and
d) a step platform fixably attached between each arm, which provides a convenient footstep to assist a person who is entering or exiting a vehicle.

* * * * *